March 23, 1926.

F. M. FISH 1,577,458

CHAIN TROLLEY

Filed June 29, 1925

F. M. FISH.
INVENTOR

BY Victor J. Evans

ATTORNEY

Patented Mar. 23, 1926.

1,577,458

UNITED STATES PATENT OFFICE.

FRANK M. FISH, OF CRAFTON, PENNSYLVANIA.

CHAIN TROLLEY.

Application filed June 29, 1925. Serial No. 40,398.

*To all whom it may concern:*

Be it known that I, FRANK M. FISH, a citizen of the United States, residing at Crafton, in the county of Allegheny and State of Pennsylvania, have invented new and useful Improvements in Chain Trolleys, of which the following is a specification.

This invention relates to trolleys, and more particularly to a chain trolley.

One of the main objects of the invention is to provide a trolley of simple construction and operation which may be readily produced at small cost and can be applied to a link chain of standard construction. A further object is to provide a trolley in which the load supporting member is connected directly to the trolley carriage so that the load is supported directly from the track or rail, the chain being relieved of all strains and stresses incident to supporting the load. Another object is to provide a trolley in which the load supporting member also serves to support the chain and to provide a pintle or pin for connecting the overlapping ends of the plates of the chain links. Further objects will appear from the detail description.

In the drawings:—

Figure 1:
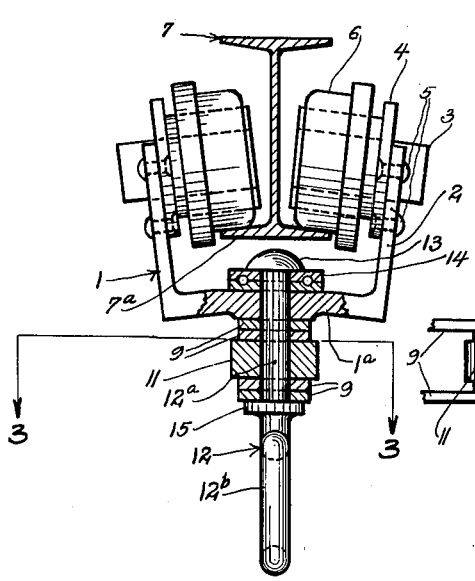
Figure 1 is a front view, partly in section, showing my trolley as applied.

The trolley includes a frame or carriage 1 of approximately U-shape in each arm 2 of which is mounted a stub shaft 3, this stub shaft seating in the upper portion of arm 2 and passing through a plate 4 secured to the arm by rivets 5 or in any other suitable manner. Flanged wheels 6 are suitably mounted upon stub shafts 3 and travel upon base flange 7ª of a track or rail 7 suitably supported, this track or rail being shown as formed of an I-beam of commercial type, though any other suitable rail may be used. The stub shafts 3 are disposed at an inclination so that the wheels 6 seat properly upon the downwardly and outwardly inclined portions of flange 7ª, as illustrated.

Figure 2:
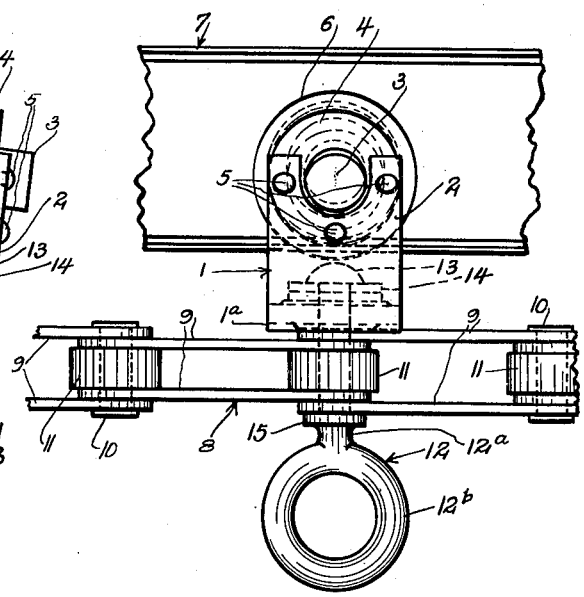
Figure 2 is a side view.
Figure 3:
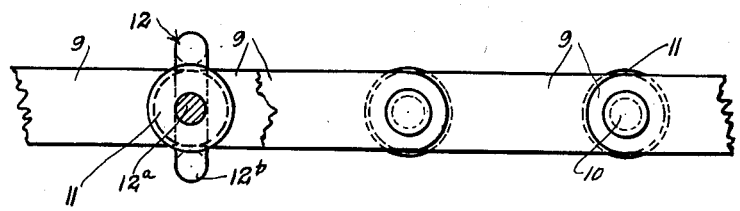
Figure 3 is a section taken substantially on line 3—3 of Figure 1, the chain being partly shown in plan view.

This carriage and associated parts are used in connection with a chain 8 of known construction the links of which are formed by flat plates 9 the ends of which are disposed in overlapping relation and receive pins 10 inserted therethrough, rollers 11 being mounted upon these pins. These rollers act as spacing members and also serve as antifriction members for engagement with the sprockets of a suitably positioned and driven sprocket wheel for propelling the chain which can be in the form of an endless chain or conveyor. The trolley carriages are positioned at suitable intervals along the chain and each carriage is connected to the chain by means of an eye bolt 12. The shank 12ª of this bolt replaces the pin 10 and extends through the overlapping ends of plates 9 and through roller 11. The shank of this bolt also extends through the bight portion 1ª of trolley carriage 1 and has its upper end headed at 13. Preferably, though not necessarily, a suitable antifriction bearing 14 is provided between head 13 and the bight portion 1ª of trolley carriage 1. As will be clear from Figures 1 and 2, shank 12ª is positioned centrally of bight portion 1ª of carriage 1 and the axis of this shank is coincident with the vertical plane of the axes of stub shafts 3. Bolt 12 is provided, a short distance above eye 12ᵇ thereof, with a shoulder 15 which serves to support the lower plate 9 of the chain link. Eye 12ᵇ provides simple and efficient means for securing a load to be transported to the eye bolt. The load is supported directly from rail 7 through the eye bolt 12 and carriage 1 and associated parts so that there is no strain placed upon the chain or any of the links thereof. This provides a trolley which is capable of supporting and transporting unusually heavy loads as the chain is subjected to tension only in transporting the loads and is not at any time subjected to the downward pull of the load and the severe strains and stresses which would result therefrom. By constructing the trolley in the manner illustrated and described a link chain of commercial type which employs flat overlapping links may be utilized thus providing a trolley of very simple and inexpensive construction which can be quickly and easily assembled at small cost.

As will be understood, and as above indicated, changes in construction and arrangement of parts of the invention may be resorted to without departing from the field and scope of the same, and I intend to include all such variations, as fall within the scope of the appended claims, in this application in which a preferred form only of my invention is disclosed.

What I claim is:—

1. In a trolley, a carriage, anti-friction members carried by the carriage and disposed to travel upon a supporting rail, a chain having overlaping links, and a load receiving member depending from the carriage and passing through the overlapping portions of the chain links.

2. In a trolley, a carriage, anti-friction members carried by the carriage and disposed to travel upon a supporting rail, a chain having overlapping links, and a load receiving member depending from the carriage and passing through the overlapping portions of the chain links, said member also supporting the chain.

3. In a trolley, a carriage, anti-friction members carried by the carriage and disposed to travel upon a supporting rail, a chain having overlapping links, and a load receiving member including a shank connected directly to the carriage, said shank passing through the overlapping portions of the links and being provided with an abutment element supporting the lower one of the links.

4. In a trolley, a carriage, anti-friction members carried by the carriage and disposed to travel upon a supporting rail, a chain having overlapping links, and an eye bolt having its shank secured through said carriage and passing through the overlapping end portions of the links and pivotally connecting the same.

5. In a trolley, a carriage, anti-friction members carried by the carriage and disposed to travel upon a supporting rail, a chain including links formed of pairs of plates disposed with the end portions of each pair in overlapping relation to the end portions of the plates of the succeeding pair, a spacing member disposed between the overlapping portions of the plate, and an eye bolt having its shank secured through the carriage and passing through the overlapping portions of said plates and the spacing member.

6. In a trolley, a carriage, anti-friction members carried by the carriage and disposed to travel upon a supporting rail, a chain including links formed of pairs of plates disposed with the end portions of each pair in overlapping relation to the end portions of the plates of the succeeding pair, a spacing member disposed between the overlapping portions of the plate, and an eye bolt having its shank secured through the carriage and passing through the overlapping portions of said plates and the spacing member, downward movement of the overlapping end portion of the lowermost plate being positively limited.

7. In a trolley, a carriage, anti-friction members carried by the carriage and disposed to travel upon a supporting rail, a chain including links formed of pairs of plates disposed with the end portions of each pair in overlapping relation to the end portions of the plates of the succeeding pair, a spacing member disposed between the overlapping portions of the plate, and an eye bolt having its shank secured through the carriage and passing through the overlapping portions of said plates and the spacing member, the shank of the bolt being disposed midway between the rail engaging anti-friction members.

8. In a trolley, a carriage, anti-friction members carried by the carriage and disposed to travel upon a supporting rail, a chain including links formed of pairs of plates disposed with the end portions of each pair in overlapping relation to the end portions of the plates of the succeeding pair, a spacing member disposed between the overlapping portions of the plate, and an eye bolt having its shank secured through the carriage and passing through the overlapping portions of said plates and the spacing member, the shank of the bolt being positioned midway between and in the vertical plane of the axes of the rail engaging anti-friction members.

9. In combination with a chain having the end portions of succeeding links disposed in overlapping relation, a carriage adapted for travel on a supporting rail, and a supporting member extending from the carriage, said supporting member extending through and pivotally connecting the overlapping end portions of the chain links.

In testimony whereof I affix my signature.

FRANK M. FISH.